United States Patent
Gahan et al.

(10) Patent No.: US 7,065,670 B2
(45) Date of Patent: Jun. 20, 2006

(54) SERVER MONITORING AND FAILOVER MECHANISM

(75) Inventors: Richard A. Gahan, Gory (IE); John Hickey, Ratoath (IE)

(73) Assignee: 3Com Corporation, Santa Clara, CA (US)

( * ) Notice: Subject to any disclaimer, the term of this patent is extended or adjusted under 35 U.S.C. 154(b) by 463 days.

(21) Appl. No.: 10/284,475

(22) Filed: Oct. 31, 2002

(65) Prior Publication Data

US 2003/0084100 A1    May 1, 2003

(30) Foreign Application Priority Data

Nov. 1, 2001    (GB) .................................... 0126175

(51) Int. Cl.
*G06F 11/00*    (2006.01)
(52) U.S. Cl. .......................................... 714/4; 711/133
(58) Field of Classification Search .................... 714/4, 714/3, 5, 8, 13; 711/133; 709/223
See application file for complete search history.

(56) References Cited

U.S. PATENT DOCUMENTS

| 5,675,723 | A |   | 10/1997 | Ekrot et al. |
| 5,987,621 | A | * | 11/1999 | Duso et al. ..................... 714/4 |
| 6,005,920 | A | * | 12/1999 | Fuller et al. ............... 379/9.05 |
| 6,119,244 | A |   | 9/2000 | Schoenthal |
| 6,134,673 | A | * | 10/2000 | Chrabaszcz .................. 714/13 |
| 6,609,213 | B1 | * | 8/2003 | Nguyen et al. ................ 714/4 |
| 6,625,750 | B1 | * | 9/2003 | Duso et al. ..................... 714/11 |

FOREIGN PATENT DOCUMENTS

EP    0760503 A1    3/1997

* cited by examiner

*Primary Examiner*—Nadeem Iqbal
(74) *Attorney, Agent, or Firm*—Nixon & Vanderhye P.C.

(57) ABSTRACT

Access of a malfunctioning server to a data storage facility is blocked. Characteristics such as IAmAlive signals from a server are monitored and when out of profile a malfunction is indicated and data access of that server is inhibited. Characteristics continue to be monitored for a return from the malfunction. The system can be used in a resilient cluster of servers to shut out a malfunctioning server and enable its recovery to be indicated so as to enable readmittance to the cluster.

9 Claims, 3 Drawing Sheets

SERVER MONITORING AND FAILOVER MECHANISM

FIELD OF THE INVENTION

This invention relates to data storage and access and resilient systems with failover mechanisms.

BACKGROUND TO THE INVENTION

In a typical network a plurality of servers are linked via a switch to block storage. The servers run different applications or service different clients and have exclusive access to the block storage data for those clients or applications.

Servers may be arranged in pairs or clusters that are 'resilient' i.e., are aware of the status or operation of the other servers and can take over from one another in the event of failure. When such resilience operates it is essential that only one server attempts to access the data to avoid corruption. Therefore when failure of a server is detected and its functions assumed by another server, it is usual for the failed server to be powered down, and effectively permanently removed from the cluster.

Although systems continue to function without the failed server, there are instances where the failure may potentially be temporary or recoverable, but as the failed server is powered down this cannot be detected. It would be more efficient if temporary or recoverable failures did not result in permanent removal of a server from active functioning.

SUMMARY OF THE INVENTION

The present exemplary embodiment is directed towards providing a resilient switchover mechanism that allows a subsequently recovered server to reassume operation and be restored to active membership of a cluster.

Accordingly the exemplary embodiment provides a method of monitoring server function and controlling data storage access, the method comprising monitoring a characteristic of a transmission from a server and determining whether the characteristic is within a predetermined profile, when the characteristic is not within said predetermined profile, blocking data storage access of the server to a related storage facility, and monitoring for a return to profile of said characteristic.

The exemplary embodiment further provides a switch for linking a cluster of servers to a data storage facility, the switch comprising a facility to block ports to data traffic while allowing passage of cluster monitoring traffic, and in which the switch monitors a characteristic from the servers for an indication of a malfunction and when a malfunction is indicated blocks data traffic on the port of the malfunctioning server, and monitors for an indication of correction of the malfunction.

The exemplary embodiment also provides a resilient cluster of servers linked via a switch to a data storage facility, the servers each transmitting cluster control signals that are detected in the switch and provide an indication of the functioning of the server, and in which when an indication of a malfunction of a server is determined, the switch blocks the access of the malfunctioning server to the storage facility but maintains monitoring for cluster control signals related to the malfunctioning server.

Within the context of this specification a cluster of servers is any plurality of actual or virtual servers which may not necessarily be physically separate.

BRIEF DESCRIPTION OF THE DRAWINGS

The invention is now described by way of example with reference to the accompanying drawings in which.

DETAILED DESCRIPTION OF PREFERRED EMBODIMENT

Figure 1:
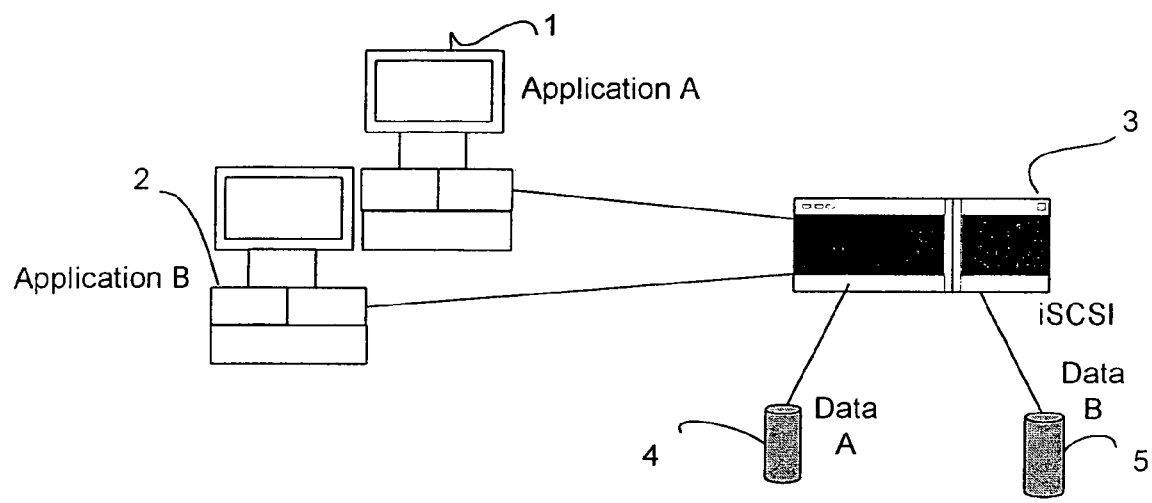
FIG. 1 is a schematic diagram of a network.

Referring to FIG. 1, a simple network is shown consisting of two servers 1, 2 a switch 3 and a storage facility having addressable storage space, shown schematically as areas 4 and 5. In practice the network would usually be more complex with many more servers and storage spaces, and the storage facility may itself be a network or a plurality of networks.

Server 1 runs application A and accesses Data A in storage area 4. Server 2 runs application B and accesses Data B in storage area 5. It will be appreciated that the storage areas 4 and 5 may be any part or parts of the same or different storage area network, but are switched via the common switch 3. The servers 1 and 2 are configured as failovers for one another and may be regarded as a simple cluster.

In the event of a failure in one of the servers, this is detected by the other server which commands the switch 3 to block the port to the failed server and thus stops communication with the failed server and prevents it from attempting to access data. Having blocked the port, the failover server assumes the functions of the failed server.

Although the port is blocked for data access, it is blocked in a way that still allows passage of cluster or monitoring signals. Also, the failed server is not powered down and can therefore, potentially, communicate its recovery with cluster control signals to the cluster via the switch, even though it is blocked from accessing its storage which has been assigned in the failover to another server.

The switch is programmed with current cluster member and storage entity/access relationships and updates the relationships when instructions to change are received, as occurs in failover when the storage of the failed server is reassigned. In the event of recovery of the failed server, for example after a reset or a power cycle, the failed server can be interrogated by the other server, or in the more general case by another active member (or the master member) of the cluster. In the context of a failure type of malfunction this will be instigated by a change or reappearance of an IAmAlive message from the failed server, but other types of malfunction such as temporary overload may be signaled differently. If the interrogation establishes recovery, then commands are generated to enable the server to be readmitted to active membership of the cluster and the block on access to storage removed, with the failover server's access to that storage inhibited and the storage access relationship within the switch updated.

In order to function efficiently the switch prioritizes cluster control IAmAlive messages between cluster members, or itself and cluster members, so as to enable recovered servers to become active and also to prevent mistaken assumptions of failure. Dataflow from the cluster members via the switch is also monitored to detect loss of traffic or loss of link live status.

The switch may also monitor other functions or characteristics and provide temporary port blocks, for example to an overloaded server, by monitoring for out of profile traffic both to and from the ports of cluster members.

In addition to retaining updated cluster member and storage entity/access relationships, the switch may monitor for the correct access being requested. This monitoring may be carried out by deep packet inspection to determine LU or LUN target identifier or IP address, LU, LUN identifier and block number or block range blocking.

Further detail of modes of implementation using IAmAlive message monitoring is now described. Other functions or signals, generally termed a characteristic, may be monitored in a corresponding way either separately or added to these implementations.

The participation of the switch in the clustering protocol may be passive or active. In the passive mode IAmAlive monitoring is carried out by cluster members as well as the switch, and is most useful in small clusters. In larger clusters it is generally better to perform all the monitoring and processing in the switch.

Figure 2:
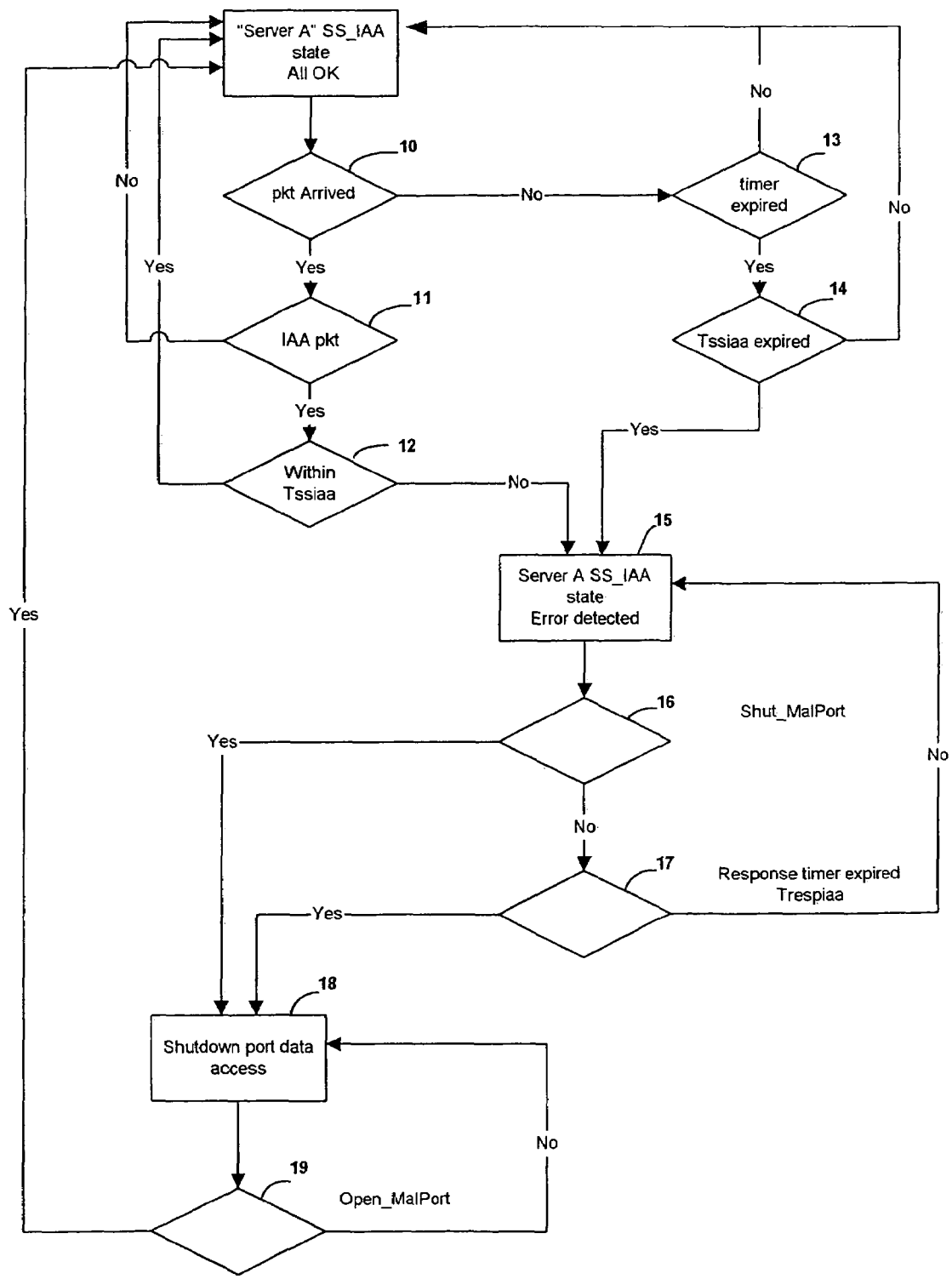
FIG. 2 is a flow diagram of switch monitoring functions in a passive mode.

FIG. 2 is an exemplary flow diagram of the passive mode of operation, as implemented in the switch. In this implementation protocol, the servers communicate by swapping IAmAlive packets designated SS_IAA (Server to server IAmAlive), within a time interval $T_{ssiaa}$ which depends upon the recovery time required and depending upon the application may be, for example, from 1 ms to several seconds.

Each server times the arrival of each SS_IAA from its peer cluster and determines if each node is behaving within specification, i.e. sending out SS_IAA at regular intervals.

The switch also monitors the transmission of the SS_IAA alive packets and whether these are received in the time limit. This is shown in FIG. 2 by the Pkt Arrived stage 10, which determines when a packet has arrived whether if it is an IAmAlive packet (stage 11) and whether it has come within $T_{ssiaa}$ (stage 12). If it has then the next IAA from that server is awaited within the next time interval. (Each server is monitored similarly, FIG. 2 illustrates the procedure with respect to one server 'A').

If stage 10 determines a packet has not arrived, the time interval is checked in stages 13 and 14, and if the $T_{ssiaa}$ has expired stage 15 signals an error. A similar signal is generated if stage 12 gives a $T_{ssiaa}$ expired output.

In this mode it is the monitoring server in the cluster that will initiate a signal to shut down the malfunctioning port, having monitored the IAA packets similarly to as shown for the switch along the path of stages 10, 11 and 12. At stage 16 completion of the shut down from the monitoring server Shut_MalPort is awaited. If it is not completed within a specified response time interval $T_{respiaa}$ (stage 17) the switch will intervene to disallow the failed server access to its data (stage 18) in order to protect the data from being corrupted by the failed server. More usually, the stage 18 port shutdown is arrived at via completion of transfer of the functions of the failed server to another good server and the YES response at stage 16.

The shutdown of the port is maintained but at stage 19 the switch awaits an Open_MalPort signal from the monitoring server which monitors for IAA message resumption from the failed server. When such a message is resumed the access relationship is updated, the port is opened and the switch resumes monitoring the IAA packets as previously described. The resumption of the IAA message will be a return to in specification (or in profile) messages as the shutting of the port may be instigated by irregular or other out of profile messages as well as their abscence.

In this mode of operation the switch is designed with special cluster enabling functions that enable physical or virtual ports to be blocked and the ability to identify cluster monitor packets, allow them to their destination and monitor their arrival within time parameters.

This passive mode of operation is acceptable for small clusters where the amount of cluster to cluster traffic is small. However, some cluster member processing time is wasted by both sending and receiving cluster IAmAlive messages.

Figure 3:
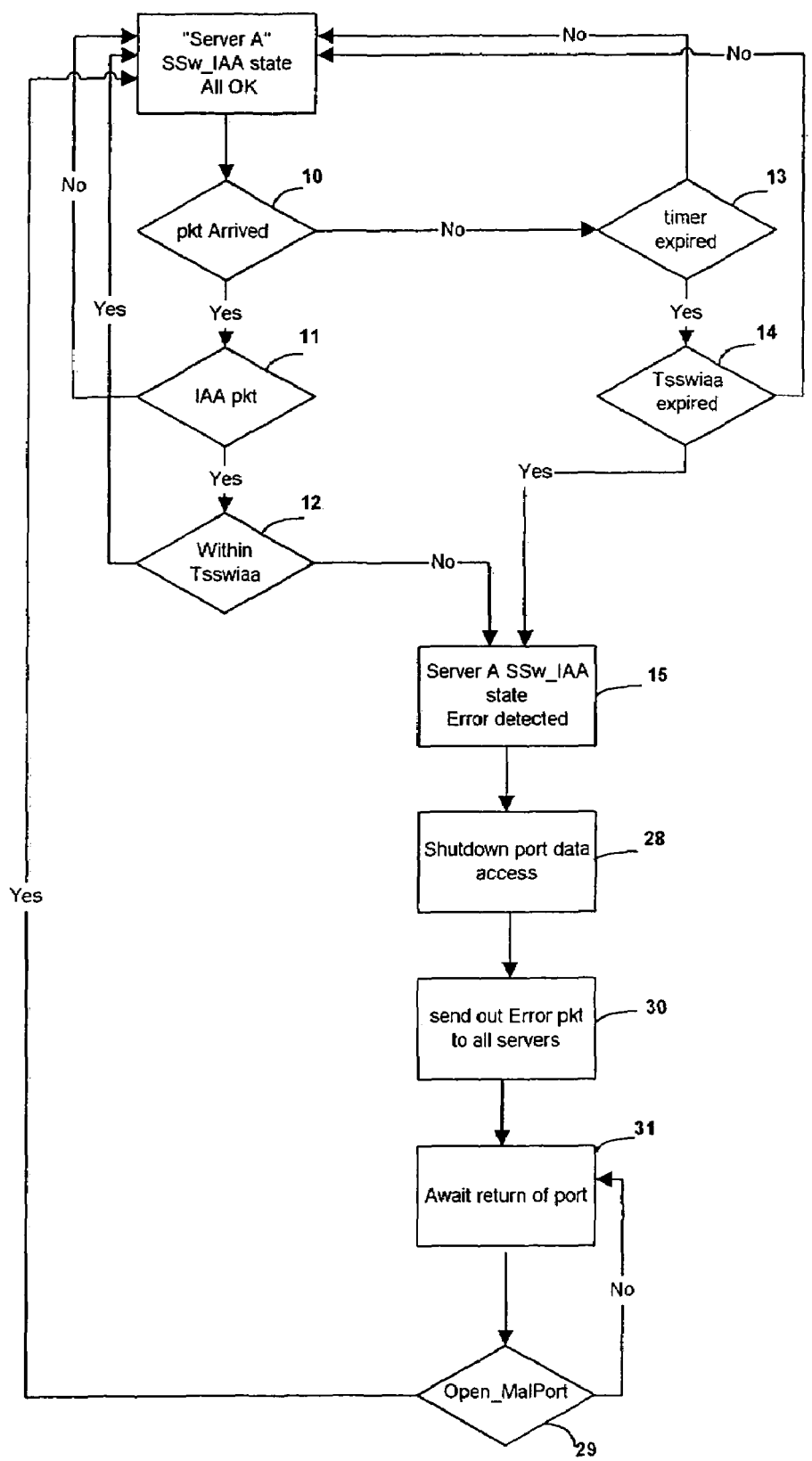
FIG. 3 is a flow diagram of switch monitoring functions in an active mode.

FIG. 3 is a flow diagram of switch monitoring in the active mode of operation in which the processing takes place in the switch.

Instead of server to server IAA messages, the servers communicate with the switch by swapping server to switch IAA packets SSw_IAA within a time period of $T_{swiaa}$. The switch now monitors the server to switch IAA packets from each of its attached cluster members and determines if each node is behaving within specification. Apart from the different type of signal, and that it does not have to be forwarded on, the process of monitoring exemplified in stages 10 to 15 is the same as in FIG. 2.

However after stage 15, instead of waiting for a monitoring server or timeout to instigate shutdown, the switch shuts down the access to the data port (stage 28) and sends out error packet signals to all the servers (stage 30). The cluster members will then initiate the failover of the malfunctioned node/server to the standby member.

The shutdown of the port still allows the cluster control packets to pass and stage 31 monitors for the resumption of these back into specification and stage 29 issues the instruction on whether or not to open the port. The port will be opened when the access has been updated and returned from the failover port to the recovered port.

In this mode, in addition to the server to switch IAA messages, the switch also sends IAA messages to each of its attached cluster members. Thus the servers monitor functioning of the switch, and vice versa, but the servers do not monitor one another.

Monitoring of signals or characteristics other than IAmAlive may also take place and initiate a port shutdown procedure. Timing may not be the determining factor in all instances, for example out of profile traffic or inappropriate access request may also prompt closure. Some of the inspection by the switch may be for security purposes. In general any out of profile or out of specification behaviour may be monitored, and its return to in profile/specification detected.

The implementation of the invention may be entirely in the switch, for example as described in respect of FIG. 3 monitoring IAA signals, or it may involve both server and switch as described for FIG. 2.

In general, the services that the switch may optimally provide are:

1. Prioritization of IAmAlive messages between cluster members. This prioritization minimizes loss of such messages which might, if lost, result in mistaken assumption of a failure of a server function.

2. Monitoring of dataflow from the ports of each cluster processor member such that out of profile traffic, loss of traffic or loss of link live status is detected and alerts are forwarded to each cluster member.

3. Monitoring of dataflow to cluster member ports to keep traffic to a port within an egress profile in order to ensure that a cluster member is not overburdened in processing its ingress packet flow. In the event of a congestion situation the switch may either discard packets or buffer them.

4. Retaining current cluster member-storage entity relationships. This will update as instructions to change are received, for example the switch will block off access between a cluster member and its associated storage entity if the traffic flow is out of profile or if it is instructed to do so by a valid cluster member as is necessary when a failover has been implemented. The first of these block off examples may be short term during a period of congestion, while the second may be a longer term measure.

5. Allowing communication between failed cluster member processing entities and other active and good cluster processing entities even though a failing member is prevented from accessing its storage (which is accessed after failover by another cluster member). When a failed member reverts to good, as may happen after a reset or power cycle, then the failed member may be interrogated by an active cluster member, or the cluster master member, and re-admitted to the cluster and regain access to its storage devices with the cluster member that had taken over on failover ceasing to have access to that storage.

6. Monitoring correct access. In a properly running system each cluster processing entity has access to specific storage partitions. The switch monitors nodes and the partitions that are being accessed and prevents a node attempting to access storage not assigned to it.

These characteristics may be monitored individually, but most usefully some or all of them in combination. Some characteristics can be monitored directly, others may be by the production of signals indicative of particular conditions.

The criteria for blocking a port and readmittance may not be symmetrical. A port may be blocked for failure to meet a range of criteria more generally referred to as a 'malfunction'. The criteria include predetermined profiles of given characteristics.

Readmittance to the cluster (i.e. unblocking the port) may require a return to the same or stricter criteria. Then once those criteria are satisfied data operations can not commence until the access paths have been reassigned and membership confirmed. The switch or other controlling system may be configured to require readmittance to be confirmed by a network supervisor or other manual intervention.

What is claimed is:

1. A switch for linking a cluster of servers to a data storage facility, the switch comprising:
   a facility to block ports to data traffic while allowing passage of cluster monitoring traffic,
   a server malfunction monitor which monitors a characteristic from the servers for an indication of a malfunctioning server and when a malfunctioning server is indicated blocks data traffic on a respective port coupled to said malfunctioning server, and
   a repaired server monitor which monitors for an indication of correction of the malfunctioning server.

2. The switch of claim 1 in which the characteristic comprises arrival of IAmAlive signals from the servers in said cluster within a predetermined time interval.

3. The switch of claim 1 in which the characteristic is monitored for out of profile behavior.

4. The switch of claim 1 in which a port blocked to data traffic is automatically opened when a previously malfunctioning server attached to the port resumes correct functioning as detected by said repaired server monitor.

5. A data storage network comprising:
   (a) a resilient cluster of servers;
   (b) a data storage facility; and
   (c) a switch coupling each of said servers to said data storage facility;
   wherein
   (d) the servers each transmit cluster control signals that provide an indication of the functioning of a respective server, and
   (e) said switch detects said cluster control signals and when an indication of a malfunctioning server is determined, blocks access of the malfunctioning server to the storage facility but maintains monitoring for cluster control signals related to the malfunctioning server.

6. The data storage network of claim 5 in which the servers monitor one another and initiate a shut port procedure that is transmitted to the switch in the event of a server malfunction.

7. The data storage network of claim 5 in which the switch initiates a shut port procedure when it detects a malfunction.

8. The data storage network of claim 5 further comprising means for automatically determining correction of the malfunction in response to said maintained monitoring cluster control signals from said malfunctioning server.

9. a method of operating a data storage network comprising a resilient cluster of servers, a data storage facility and a switch coupling each of said servers to said data storage facility, said method comprising:
   transmitting, from each of said servers to said switch, cluster control signals that provide an indication of the functioning of respectively associated servers;
   detecting, in said switch, said cluster control signals; and
   when an indication of a malfunctioning server is determined by said switch, blocking by means of said switch access of the malfunctioning server to the storage facility while maintaining monitoring by said switch for cluster control signals related to the malfunctioning server.

* * * * *